Sept. 2, 1930. J. R. HACKETT 1,774,551
COMBINATION BREAD AND FRUIT CUTTING SET
Filed Aug. 19, 1927
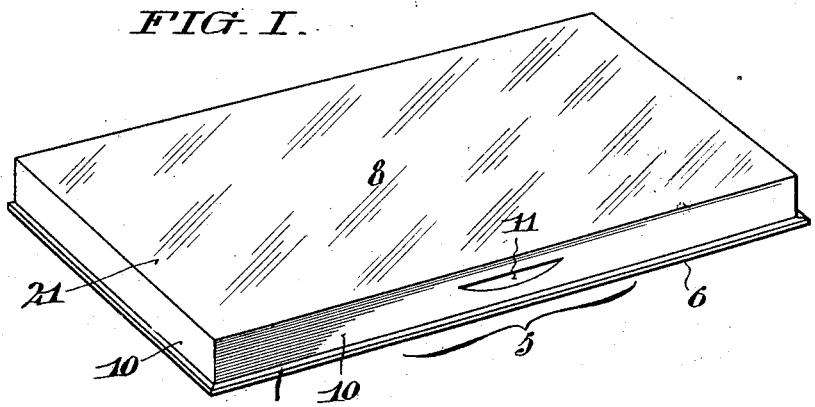
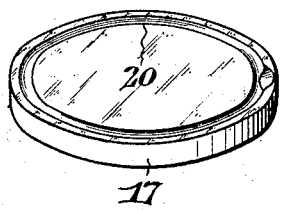
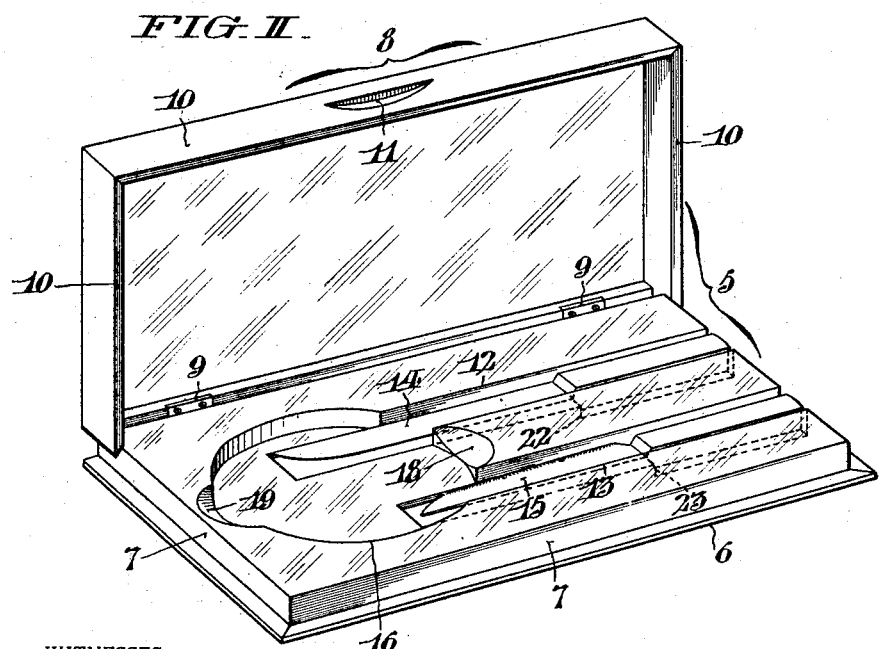
WITNESSES
Thomas W. Kerr Jr.
William Bell
INVENTOR:
James R. Hackett,
BY Fraley Paul
ATTORNEYS.

Patented Sept. 2, 1930

1,774,551

UNITED STATES PATENT OFFICE

JAMES R. HACKETT, OF PHILADELPHIA, PENNSYLVANIA

COMBINATION BREAD AND FRUIT CUTTING SET

Application filed August 19, 1927. Serial No. 214,097.

This invention relates to means for household use embodying bread and fruit cutting utilities, the primary object being to provide a novel combination bread-cutting and fruit-slicing set of foldable character, which is also constructed so as to embody storage for the bread and fruit knives.

Another object is to provide the fruit-slicing board with means effective to collect the juices during the cutting operation.

With the foregoing objects in view, my invention consists in the details of construction and combinations of elements hereinafter set forth and illustrated by the accompanying sheet of explanatory drawings, while the novel features are defined in the appended claims.

In the drawings:—

Fig. I is a perspective view of my novel combination bread and fruit cutting set in folded or closed position, or as adapted for bread-cutting.

Fig. II is a perspective view of the same in open position, with the element on which fruit may be cut removed; and, Fig. III is a perspective view of the board usable for cutting fruit, vegetables and so forth.

Similar reference numerals are applied to corresponding parts in the respective illustrations.

In carrying out my invention, I construct a box-like structure, comprehensively designated 5, of wood or any other suitable material, the same comprising a base 6, a body portion 7, and a lid 8. The base 6 is conveniently—although not essentially—rectangular in contour, with the lid 8 of corresponding form and hinged at 9 to the body portion
7. This lid 8 is constructed with a perimetric flange 10, and is adapted—when shut down—to close in the body portion 7, as clearly shown in Fig. I, while it is provided with a cut out 11, for convenience in opening.

The body portion 7, is longitudinally grooved to provide recesses 12, 13 that accommodate conventional bread and fruit cutting knives 14, 15, respectively. In addition, the body portion 7 is also formed with a circular recess 16 which accommodates a correspondingly-shaped fruit-cutting board or element 17, while opposed notches or cut outs 18, 19 are formed in the body portion 7 to facilitate removal of said element 17. This fruit-cutting board or element 17, as shown in Fig. III, is provided with a concentric groove or recession 20, in one or both of its flat faces, which serves to collect the juices of fruit, vegetables and so forth, sliced thereon.

When cutting bread the top or exposed face 21 of the lid is employed. On the other hand when fruit or vegetables are to be cut up or sliced the board or element 17 is used, either in position in the recess 16, or removed therefrom and laid on a table or other convenient supporting surface. Attention is directed to the fact that the recesses 12, 13 for the bread and fruit knives 14, 15, respectively, are slightly stepped at 22, 23 to accommodate the handles of said knives and support the blades thereof co-planer with the bottoms of the recesses aforesaid; or substantially free of contact with any surrounding parts of the structure, to thereby ensure a thoroughly sanitary organization.

From the foregoing it is thought the advantages and merits of my invention will be fully appreciated, but it is desired to stress the fact that the several elements are combined in a neat and compact maner, with provision for ready use at all times. Again by combining the recited articles in the manner set forth, a neat, handy, and extremely useful household device is provided, which can be easily maintained in cleanly condition.

Obviously, the shape of the structure 5, may be varied very considerably without departing from the scope of this invention; and, accordingly, the right is hereby reserved to make such changes as are fairly encompassed by reasonable interpretation accorded the sub-joined claims.

Having thus described my invention, I claim:—

1. A case for culinary implements comprising a base having a recess in its upper face for a removable slicing board and paralleling grooves for the reception of knives extending from said recess to one edge of the base, and a hinged cover having a marginal flange closing in the open ends of said grooves with its top seating on the base and slicing board whereby the latter as well as the knives are retained in place.

2. A case for culinary implements comprising a base having a circular recess in its upper face for a correspondingly shaped removable slicing board and paralleling stepped grooves for the reception of knives extending from the recess to one edge of the base, and the hinged cover having a marginal flange closing in the open ends of said grooves with its top seating on the base and slicing board whereby the latter as well as the handle ends of the knives are held down by said cover and the blade ends thereof by the slicing board.

In witness whereof I have hereunto signed my name at Philadelphia, Pennsylvania, this 13th day of August, 1927.

JAMES R. HACKETT.